(12) United States Patent
Pitzen et al.

(10) Patent No.: US 7,028,958 B2
(45) Date of Patent: Apr. 18, 2006

(54) STRETCH RELEASING ADHESIVE ARTICLE WITH SHAPE RETAINING MEMBER

(75) Inventors: James F. Pitzen, Maplewood, MN (US); Ronald C. Johansson, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 164 days.

(21) Appl. No.: 10/286,151

(22) Filed: Nov. 1, 2002

(65) Prior Publication Data
US 2004/0086710 A1    May 6, 2004

(51) Int. Cl.
C09J 7/02    (2006.01)
C09J 7/00    (2006.01)

(52) U.S. Cl. ............... 248/205.3; 248/304; 428/343; 428/354

(58) Field of Classification Search ............ 248/205.3, 248/304; 428/343, 354
See application file for complete search history.

(56) References Cited

U.S. PATENT DOCUMENTS

| 4,386,714 | A |   | 6/1983  | Roberto et al. |
| 5,489,035 | A |   | 2/1996  | Fuchs |
| 5,507,464 | A |   | 4/1996  | Hamerski et al. |
| 5,516,581 | A | * | 5/1996  | Kreckel et al. ......... 428/317.3 |
| 5,725,923 | A | * | 3/1998  | Lühmann .................. 428/40.1 |
| 6,004,642 | A |   | 12/1999 | Langford |
| 6,120,867 | A |   | 9/2000  | Hamerski et al. |
| 6,231,962 | B1|   | 5/2001  | Bries et al. |

FOREIGN PATENT DOCUMENTS

| DE | 33 31 016 C2   | 7/1992 |
| DE | 198 49 199 A1  | 4/2000 |
| EP | 0 733 492 A1   | 9/1996 |
| EP | 0 997 512 A2   | 5/2000 |
| WO | WO 99/31193    | 6/1999 |
| WO | WO 01/14489 A1 | 3/2001 |

* cited by examiner

Primary Examiner—Daniel Zirker
(74) Attorney, Agent, or Firm—David B. Patchett

(57) ABSTRACT

A stretch releasable adhesive tape article includes an extensible adhesive strip having a non-adhesive pull tab and a shape retaining member arranged within or adjacent to the adhesive strip. The shape retaining member is repeatably manually movable between a first position allowing a user to manually grasp the non-adhesive pull tab to stretch release the adhesive strip from a substrate, and a displaced position for maintaining the non-adhesive pull tab at a position offset from the first position.

21 Claims, 3 Drawing Sheets

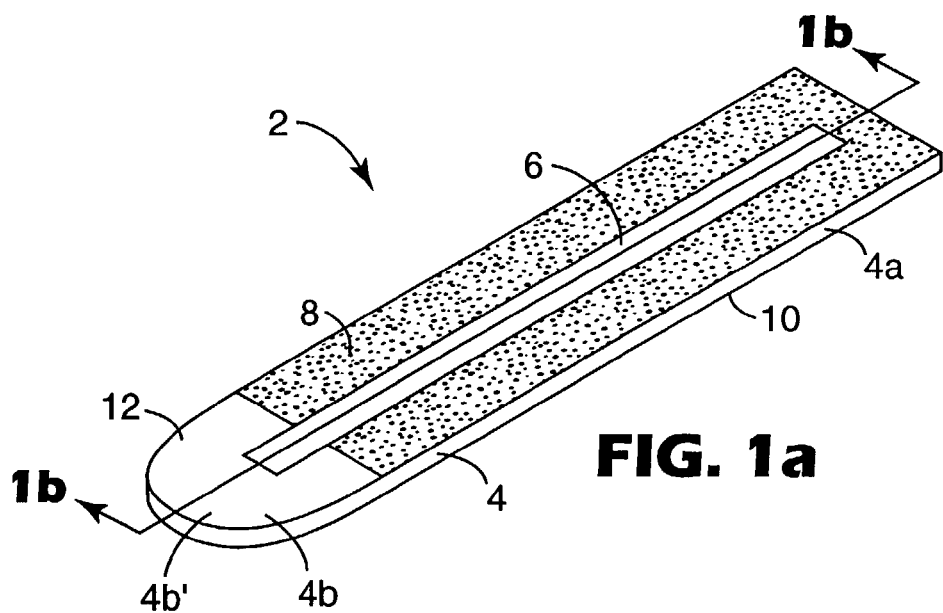
FIG. 1a
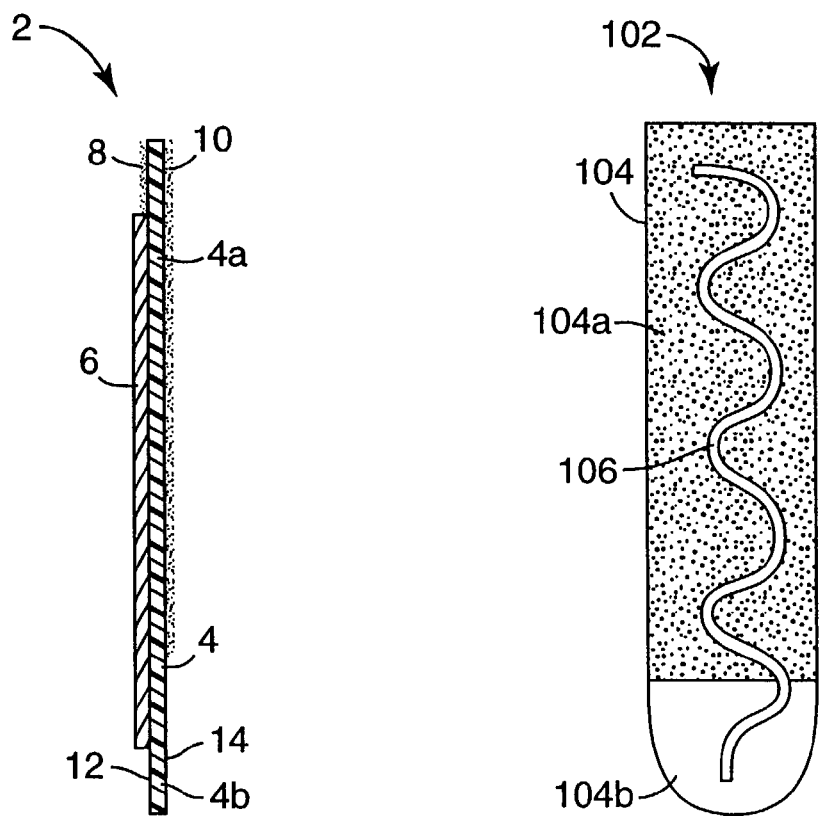
FIG. 1b
FIG. 2

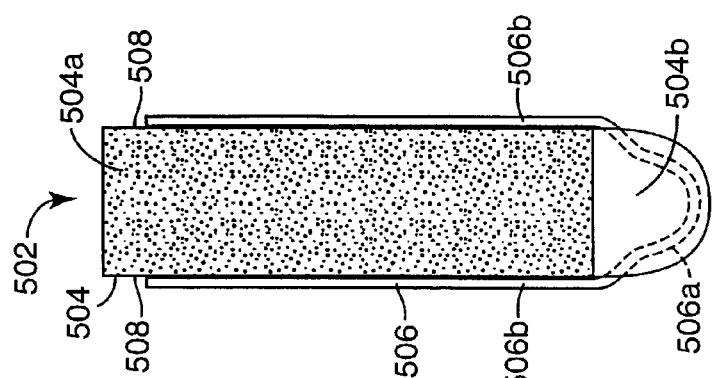
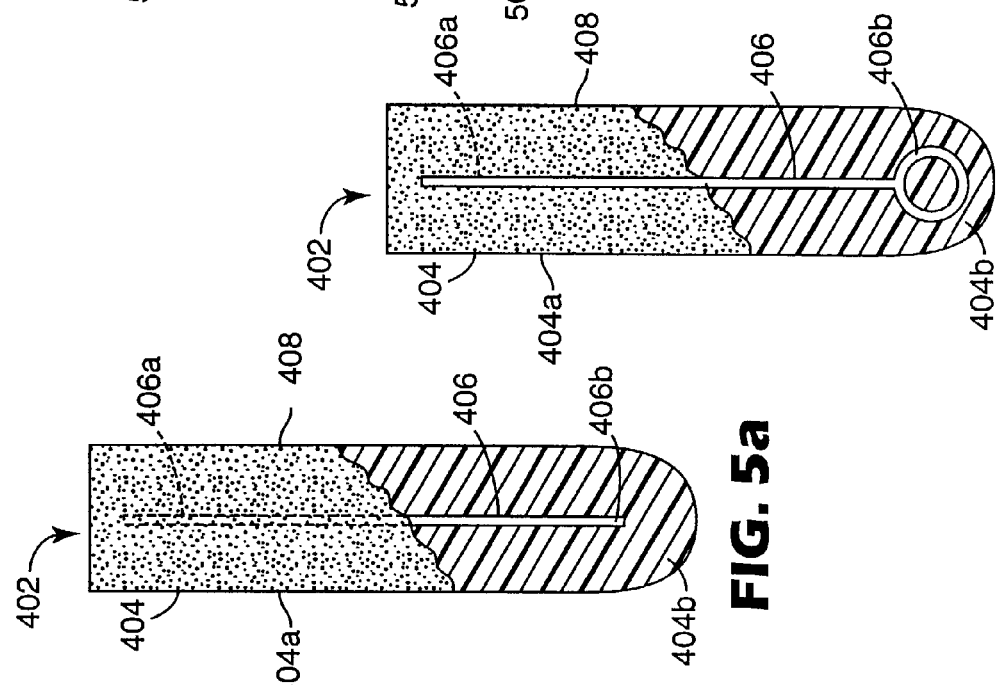
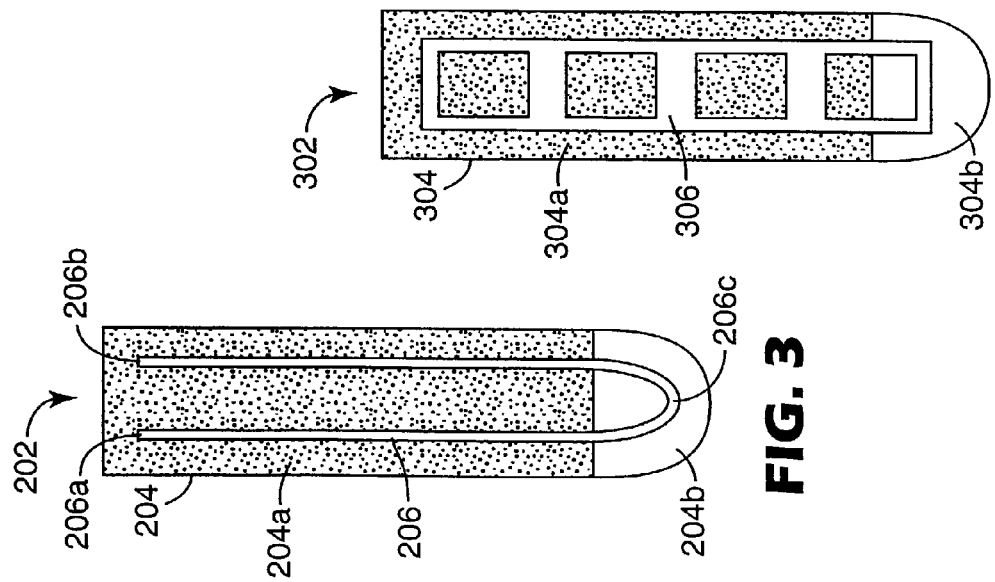
FIG. 3   FIG. 4   FIG. 5a   FIG. 5b   FIG. 6

STRETCH RELEASING ADHESIVE ARTICLE WITH SHAPE RETAINING MEMBER

FIELD OF THE INVENTION

The present invention relates generally to stretch releasing adhesive tapes that can be adhered to a substrate and subsequently cleanly removed by stretching. More particularly, the present invention relates to such a stretch releasing adhesive tape article including a shape retaining member that allows the non-adhesive pull tab portion of the adhesive strip to be moved to, and maintained in, various positions.

BACKGROUND OF THE INVENTION

Stretch releasing adhesive tapes and adhesive tape strips represent an emerging class of high performance pressure-sensitive adhesives combining strong holding power with clean removal and no surface damage. Such stretch releasing adhesive tapes are useful in a wide variety of assembling, joining, attaching, and mounting applications.

Stretch releasing adhesive tapes are known in the patented prior art. U.S. Pat. No. 4,024,312 (Korpman), for example, discloses a highly conformable adhesive tape including a highly extensible and elastic backing film laminated with an adhesive layer. The backing film possesses a lengthwise elongation at break of at least about 200%. The tape is easily stretchable and may be removed from a surface by stretching the tape lengthwise in a direction substantially parallel to the surface. German Patent No. 33 31 016 discloses a high elasticity, low plasticity adhesive film based on a thermoplastic rubber and tackifying resins, wherein the adhesive bond can be broken by stretching the adhesive film in the direction of the plane of the adhesive bond.

Adhesive tape strips with non-adhesive pull tabs are also known. U.S. Pat. No. 5,516,581 (Kreckel et al.), for example, discloses a removable adhesive tape having a highly extensible and substantially inelastic backing coated with a layer of pressure sensitive adhesive and a non-adhesive pull tab to facilitate stretch removal. The adhesive tape can be removed from a substrate without damaging the substrate by grasping the non-adhesive pull tab and stretching the tape in a direction substantially parallel to the surface of the substrate. The tape backing has a lengthwise elongation at break of from about 150% to about 1200%, a Young's modulus of at least about 2,500 psi to about 72,500 psi, and an elastic recovery of less than about 50% after being stretched and removed.

U.S. Pat. No. 6,231,962 (Bries et al.) discloses a removable foam adhesive tape with a non-adhesive pull tab. The adhesive tape comprises a backing including a layer of polymeric foam and a layer of pressure-sensitive adhesive coated on at least one surface of the backing. The foam layer of the backing has a thickness of about 30 to about 1000 mils, and the backing has a lengthwise elongation at break of from about 50% to about 1200%, and a Young's modulus of less than about 2,400 psi.

A commercially available stretch releasing adhesive tape is the product sold under the trade designation COMMAND by 3M Company, St. Paul, Minn. This product is currently manufactured in discrete strips with one end of the strip including a non-adhesive pull tab to facilitate stretching of the strip during removal.

While such stretch releasing strips generally work well, when the strip is used to join two or more objects, the tab portion at the end of a strip is often left exposed to allow a user who later wishes to separate the objects to grasp it. Such a projecting tab portion can be aesthetically objectionable. If one of the objects is flexible, such as a poster board, it may be bent to afford access to the tab portion. In many instances where rigid objects are joined, however, it may be necessary to allow the tab portion to project from between the joined objects to afford access to the tab portion to remove the adhesive strip from between the objects.

To conceal the tab portion, devices have been designed to selectively conceal the pull tab until stretch removal is desired. U.S. Pat. No. 5,507,464 (Hamerski et al.), for example, discloses a two-piece hook specially made with a slidable cover portion that selectively conceals the tab portion.

U.S. Pat. No. 5,725,923 (Lühmann) discloses a tape structure that can be used to bond opposed surfaces of objects including rigid objects with no portion of the tape structure projecting from between the objects, and which subsequently affords separation of the objects by moving one of the objects relative to the other. The tape structure is described as an adhesive tape for separable adhesive joints made from a double-sided adhesive tape which has adhesive areas on opposing sides at an offset which are not adherent, whereby the non adherent areas do not, or only slightly overlap, and which allow the adhesive joints made with them to be separated by pulling apart the non-adhesive areas, particularly by pulling in the direction of the adhesive plane.

U.S. Pat. No. 6,004,642 (Langford) discloses a tape structure that can be used to bond together the opposed surfaces of objects including rigid objects (e.g., to bond a plaque or framed picture to a wall) with no portion of the tape structure projecting from between the objects, and which subsequently affords easy separation of the objects without damage to either of them. The tape structure comprises an internally separable layer having opposite major anchor surfaces. The anchor surfaces are adapted to be bonded to the opposed surfaces of objects (e.g., by layers of pressure sensitive or other types of adhesive on the anchor surfaces or by other means such as heat fusion or the use of stretch releasable tape strips). The internally separable layer has an internal static shear strength in a direction parallel to its anchor surfaces that is adapted to support one of the objects to which it is attached from the other with its anchor surfaces vertically disposed (e.g., preferably has a static shear strength parallel to its anchor surfaces that is about equal to or exceeds the maximum static shear strength that pressure sensitive adhesive will develop with normal surfaces to which it can be adhered), and has an internal dynamic tensile strength in a direction generally normal to its anchor surfaces that will afford internal separation of the separable layer by pulling apart the objects it has joined without damaging the surfaces of those objects.

There remains a need, however, for a stretch releasing adhesive tape that includes a non-adhesive pull tab that can be arranged in a manner to minimize the visual impact of the pull tab when the adhesive tape is used to mount rigid objects. In addition, there exists a need for a stretch releasing adhesive tape that can be bent or otherwise shaped for certain end use applications such as the mounting of cables, wires, cords, or the like, on a wall surface.

SUMMARY OF THE INVENTION

The present invention provides a stretch releasing adhesive tape article including a shape retaining member that allows the non-adhesive pull tab to be selectively moved and maintained at various displaced positions, thereby allowing the pull tab to be hidden or otherwise obscured by a mounted object. The invention further provides a stretch releasing adhesive tape article including a shape retaining member that allows the adhesive strip to be bent or otherwise shaped for certain end use applications such as supporting a wire, cable, or the like.

In one embodiment, the present invention provides a stretch releasable adhesive tape article including an extensible adhesive strip having a non-adhesive pull tab and a shape retaining member connected with the adhesive strip. The shape retaining member is repeatably manually movable between a first position allowing a user to manually grasp the non-adhesive pull tab to stretch release the adhesive strip from a substrate, and a displaced position for maintaining the non-adhesive pull tab at a position offset from the first position. The shape retaining member may be affixed to an outer major surface of the adhesive strip using adhesive or conventional mechanical attachment means, may be embedded partially within the adhesive strip, or may be partially or completely enclosed within the adhesive strip.

In a preferred embodiment, the shape retaining member is stiff and bendable. Suitable materials for the shape retaining member include metals such as steel, brass, aluminum, copper, and lead, and certain synthetic plastic materials that exhibit little or no spring back or resiliency after being bent and the bending force is removed. Preferred metals include annealed metals.

In a specific embodiment, the adhesive strip has a first end portion having opposed first and second major surfaces at least one of which is adhesive, and the non-adhesive pull tab comprises a second end portion of the adhesive strip, and the shape retaining member is affixed to the first end portion adhesive surface and extends in overlapping relation with the non-adhesive pull tab. The shape retaining member may be mechanically or adhesively bonded to the first end portion adhesive surface.

The shape retaining member may comprise a thin sheet of material, may be one or more elongate members, may be hollow, and may have various configurations including serpentine or lattice-like configurations. In addition, the shape retaining member may be arranged along either major surface of the adhesive strip, may be arranged along the side edges of the adhesive strip, may be attached to the major surfaces of the adhesive strip, may be partially embedded in the adhesive strip, or may be arranged within the adhesive strip.

In another embodiment, the shape retaining member comprises a hinge that is movable between first and second fixed positions. The hinge has a first end attached to the first end portion of the adhesive strip and a second end arranged adjacent to the non-adhesive pull tab portion.

BRIEF DESCRIPTION OF THE DRAWINGS

The present invention will be further described with reference to the accompanying drawings, in which:

FIG. 1a is a perspective view of a stretch releasing adhesive article according to the invention;

FIG. 1b is a sectional view taken along line 1b—1b of FIG. 1a;

FIG. 2 is a front plan view of a second embodiment of the invention;

FIG. 3 is a front plan view of a third embodiment of the invention;

FIG. 4 is a front plan view of a fourth embodiment of the invention;

FIG. 5a is a partial sectional plan view of a fifth embodiment of the invention;

FIG. 5b is a partial sectional plan view of a sixth embodiment of the invention;

FIG. 6 is a front plan view of a seventh embodiment of the invention;

DETAILED DESCRIPTION

Figure 7A:
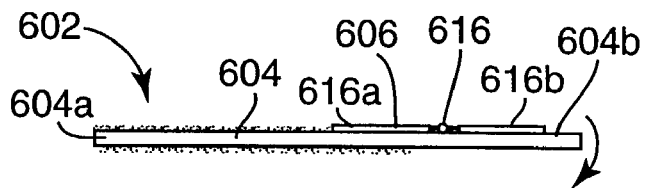
FIGS. 7a and 7b are side plan views of an eighth embodiment of the invention in a first position and a displaced position, respectively.

Referring now to the drawings, wherein functionally similar features are referred to with like reference numerals incremented by 100, FIGS. 1a and 1b show a stretch releasing adhesive tape article 2 including an extensible adhesive strip 4 and a shape retaining member 6 attached to the adhesive strip 4.

The adhesive strip 4 includes an adhesive first end portion 4a having opposed first and second adhesive major surfaces 8 and 10, respectively, and a non-adhesive pull tab portion 4b forming a second end portion having opposed first and second non-adhesive major surfaces 12 and 14. For certain end use applications, it will be desirable for one of the first or second surfaces 8 and 10 to be non-adhesive.

The adhesive strip 4 may be any conventionally known stretch releasing tape including a pressure sensitive adhesive tape with an elastic backing, a pressure sensitive adhesive tape with a highly extensible and substantially inelastic backing, or a solid, elastic pressure sensitive adhesive. Specific tapes suitable for use in the various embodiments of the present invention include the pressure sensitive adhesive tapes with elastic backings described in U.S. Pat. No. 4,024,312 (Korpman), the pressure sensitive adhesive tapes with highly extensible and substantially inelastic backings described in U.S. Pat. No. 5,516,581 (Kreckel et al.) and Bries et al. (6,231,962); and the solid, elastic pressure sensitive adhesive described in German Patent No. 33 31 016.

Figure 8:
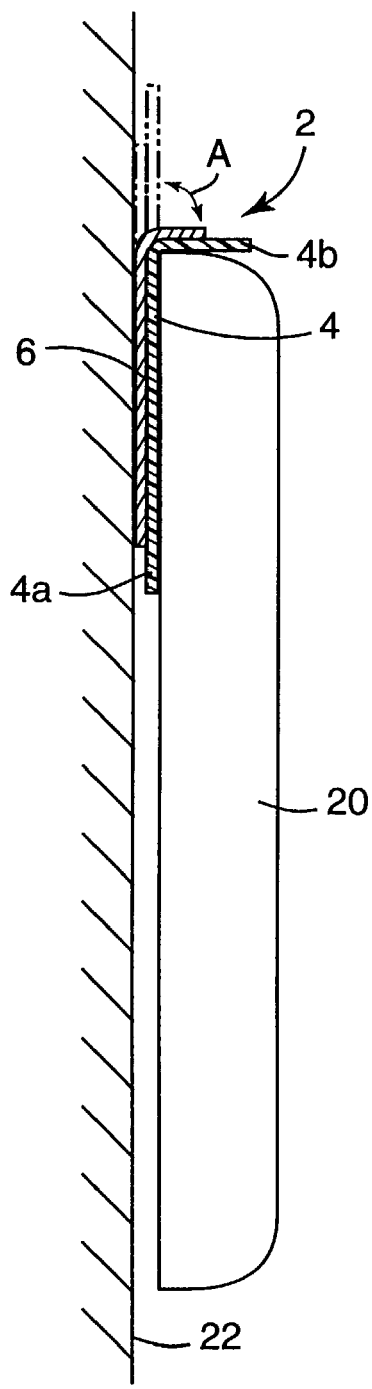
FIG. 8 is a sectional side view of the stretch releasing article of FIG. 1a being used to mount an object on a substrate.
Figure 9:
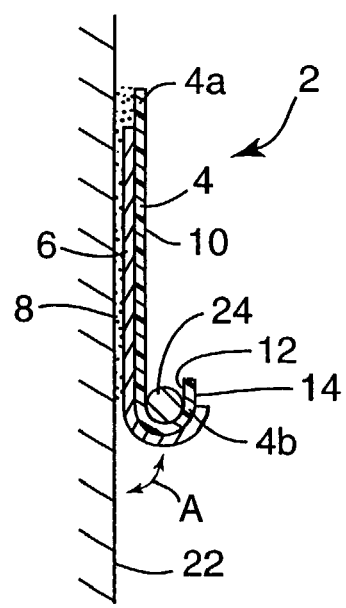
FIG. 9 is a sectional side view of a stretch releasing article similar to that of FIG. 1a being used to support a cable or the like on a substrate.

The shape retaining member 6 is arranged adjacent to the adhesive first end portion 4a and the non-adhesive pull tab portion 4b, and allows the non-adhesive pull tab portion 4b of the adhesive tape be moved to, and maintained in, various positions when the adhesive first end portion 4a is adhered to a substrate such as a wall surface. More specifically, the shape retaining member 6 is capable of being repeatably manually moved between a first position wherein the adhesive first end portion 4a and the non-adhesive pull tab portion 4b are coplanar (FIGS. 1a and 1b), and a displaced position wherein the non-adhesive pull tab portion 4b assumes a curved or angular shape offset from the plane of the first end portion 4a (FIGS. 8 and 9). In this manner, the non-adhesive pull tab 4b can be moved between a position providing access to the pull tab so that a user can manually grasp and stretch the adhesive strip 4 when removal of the adhesive tape article 2 from a substrate is desired, and a position that allows the non-adhesive pull tab 4b to be concealed along an edge of a mounted object (as shown in FIG. 8), or to allow the pull tab 4b to be formed in such a way that allows the pull tab itself to provide a supporting or mounting function (as shown in FIG. 9).

The shape retaining member 6 is an elongate metal strip partially embedded in the adhesive first end portion 4a and non-adhesive pull tab portion 4b of the adhesive strip 4. The particular configuration of the shape retaining member is not critical to the invention hereof, so long as it provides the desired function. For example, the shape retaining member may be provided in the form of an elongate strip, bar, sheet, tube, or rod of material, or it may have one of the various configurations described below.

It will be noted that the shape retaining member 6 does not extend to the end of the non-adhesive pull tab 4b, but rather extends to a position intermediate the adhesive first end portion 4a and the end of the non-adhesive pull tab portion 4b, thereby defining a terminal end portion 4bof the non-adhesive pull tab 4b that can be grasped by a user to stretch release the adhesive strip without grasping the shape retaining member 6 itself. The terminal end portion 4bis necessary for effective stretch removal because the shape retaining member is generally non-extensible and will interfere with the stretching of the adhesive strip 4.

The shape retaining member 6 may also be adhesively attached to the adhesive surface of the adhesive first end portion 4a, whereby the shape retaining member 6 extends in overlapping relation with the non-adhesive pull tab portion 4b but is not affixed thereto. To stretch remove the adhesive strip 4, the non-adhesive pull tab 4b is separated and lifted away from the shape retaining member 6 to access to the non-adhesive pull tab. In this embodiment, because the shape retaining member 6 is not attached to the non-adhesive pull tab 4b and can therefore be readily separated from the non-adhesive pull tab 4b to access the pull tab during stretch removal, the shape retaining member 6 can extend to the end or beyond the end of the non-adhesive pull tab 4b. This may be desirable for certain applications such as when the shape retaining member 6 is to be formed around an item such as a wire or cable.

The shape retaining member 6 is preferably stiff and bendable, meaning it is manually bendable either by hand or with the aid of a tool, and after the bending force is removed, it will hold its shape indefinitely when left undisturbed. In addition, the shape retaining member preferably retains its bent or deformed shape against the flex force generated by the non-adhesive pull tab when the non-adhesive pull tab has been displaced from the position it naturally reverts to when not acted on by external forces. For certain end use applications, the shape retaining member may have additional strength sufficient to support a mounted item.

The shape retaining member 6 is preferably formed of a soft metal, such as an annealed metal, that exhibits little or no spring back or resiliency after being bent and the bending force is removed. Suitable metals for the shape retaining member 6 include copper, aluminum, brass, steel, or lead. The shape retaining member 6 may be an elongate metal bar having a thickness (measured in the direction of the adhesive strip thickness) of no greater than 0.05 inches, and preferably no greater than 0.02 inches. Alternatively, the shape retaining member 6 may be an elongate metal rod or tube having a diameter of not greater than 0.1 inches, and preferably no greater than 0.02 inches.

Referring now to FIGS. 2–4, there are shown stretch releasing adhesive tape articles 102, 202, 302 including an extensible adhesive strip 104, 204, 304 and a shape retaining member 106, 206, 306 each having a different configuration. In each embodiment, the shape retaining member 106, 206, 306 is arranged adjacent to the adhesive strip 104, 204, 304 and is attached thereto via the adhesive portion 104a, 204a, 304a. The portion of the shape retaining member arranged adjacent to the non-adhesive pull tab portion 104b, 204b, 304b simply overlaps the pull tab and is not affixed thereto, thereby affording easy access to the pull tab.

FIG. 2 shows a shape retaining member 106 having a serpentine configuration. FIG. 3 shows a shape retaining member 206 having parallel rail portions 206a and 206b adjacent to the adhesive portion 204a of the adhesive strip 204, and an arcuate portion 206c adjacent to the non-adhesive pull tab portion 204b connecting the rail portions. FIG. 4 shows a shape retaining member 306 having a lattice structure.

FIG. 5a shows an adhesive tape article 402 including an extensible adhesive strip 404 and a shape retaining member 406 arranged within the adhesive strip 404. The shape retaining member 406 includes a first end portion 406a embedded within the adhesive first end portion 404a of the adhesive strip 404, and a second end portion 406b embedded within the non-adhesive pull tab portion 404b of the adhesive strip 404. The second end portion 406b extends only a short distance into the pull tab 404b, thereby providing an area of the pull tab 404b that can be grasped by a user without also grasping the shape retaining member 406. To stretch remove the adhesive strip 404, the user grasps the non-adhesive pull tab 404b without grasping the shape retaining member 406, and stretches the adhesive strip such that the adhesive strip debonds from both the shape retaining member 406 and the associated substrate to which the adhesive strip has been adhered.

Because the shape retaining member 406 is non-extensible and will prevent the adhesive tape from stretching if grasped by a user during the stretch removal process, when the shape retaining member is arranged within the adhesive strip as shown in FIGS. 5a and 5b, as opposed to being attached to an outer surface of the strip where it is readily visible to a user as shown in FIGS. 2–4, the shape retaining member is arranged to minimize the likelihood that a user will grasp the shape retaining member when grasping the pull tab during the stretch removal process. For example, because a user is most likely to grasp the center of the pull tab 404b, the shape retaining member 406 preferably extends only a short distance into the pull tab 404b region of the adhesive strip 404. Proper removal can be further facilitated by providing directions or indicia on the pull tab instructing the user how and where to grasp the pull tab.

FIG. 5b shows an adhesive tape article 402 similar to that in FIG. 5a except the second end portion 406b of the shape retaining member 406 is O-shaped. The O-shaped end portion 406b is arranged in the non-adhesive pull tab 404b in such a manner that the user will tend to grasp it during the removal process. Effective stretch removal of such an adhesive strip can still be accomplished if the first end portion 406a of the shape retaining member arranged within the adhesive first end portion 404a of the adhesive strip 404 is not attached to the adhesive strip or is otherwise able to move freely and independently with respect to the adhesive first end portion 404a. This may be accomplished, for example, by providing the first end portion 406a of the shape retaining member 406, which is arranged in the adhesive first end portion 404a of the adhesive strip 404, with a slip agent such as silicon or the like.

Other shape retaining members arranged within the adhesive strip are also considered within the purview of the invention. For example, the shape retaining member may comprise a single elongate strip of material arranged along either side edge of the adhesive strip. When arranged in this manner, the shape retaining member will not be grasped by the user during the removal process, and will therefore not interfere with the stretch releasing of the adhesive strip.

FIG. 6 shows an adhesive tape article 502 including an extensible adhesive strip 504 including an adhesive first end portion 504a and a non-adhesive pull tab 504b, and a shape retaining member 506 including an intermediate portion 506a arranged within the non-adhesive pull tab 504b and end portions 506b extending outwardly from opposite sides of the non-adhesive pull tab 504b. The end portions 506b are arranged adjacent to and extend along the side edges 508 of the adhesive strip 504 but are not attached to the adhesive strip. Arranged in this manner, the adhesive tape article 502 can be removed from a surface to which it is adhered by grasping pulling both the non-adhesive pull tab 504b and the associated intermediate portion 506a of the shape retaining member 506 to effect stretch removal of the adhesive end portion 504a without interfering with the removal process. This is possible because the end portions 506b of the shape retaining member 506 are not attached to the adhesive first end portion 504a of the adhesive strip 504 and therefore allow the adhesive first end portion 504a to readily stretch when the non-adhesive pull tab 504b is grasped and pulled.

Figure 7B:
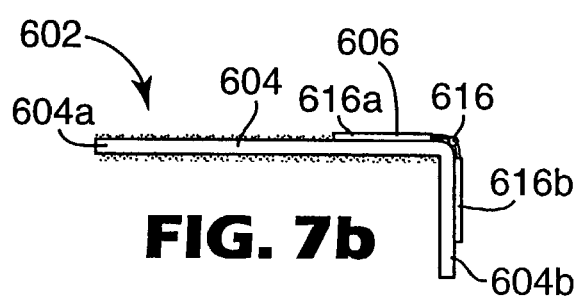

FIGS. 7a and 7b show a stretch releasing adhesive tape article 602 including an extensible adhesive strip 604 having an adhesive first end portion 604a and a non-adhesive pull tab portion 604b, and a shape retaining member 606 comprising a hinge 616 having a first end 616a attached to the adhesive first end portion 604a and a second end 616b arranged adjacent to the non-adhesive pull tab portion 604b. The hinge 616 is movable between a first fixed position wherein the adhesive first end portion 604a and non-adhesive pull tab portion 604b are coplanar (FIG. 7a), and a second fixed position wherein the adhesive first end portion 604a and non-adhesive pull tab portion 604b are arranged at an angle (FIG. 7b). The hinge 616 is intended to represent a large number of known hinges that are repeatably movable between at least two fixed positions such as molded plastic hinges often used on cosmetic containers such as toothpaste caps and shampoo bottles. Such hinges are disclosed in, for example, U.S. Pat. No. 4,386,714 (Roberto et al.) and U.S. Pat. No. 5,489,035 (Fuchs).

FIG. 8 shows the double sided adhesive tape article 2 of FIGS. 1a and 1b being used to mount an object 20, such as a plaque or calendar, on a wall surface 22. The adhesive first end portion 4a of the adhesive strip 4 is arranged between the object 20 and the wall surface 22 and the non-adhesive pull tape portion 4b projects outwardly from between the object and wall surface where it can be moved as indicated by letter A between a position adjacent to the wall surface 22, shown in phantom, and a displaced position adjacent to the top of the object 20. When positioned adjacent to the top edge of the object 20, the pull tab 4b is somewhat concealed by the object itself and is therefore less conspicuous to those viewing the object. To remove the adhesive tape 4, the non-adhesive pull tab 4b and the associated portion of the shape retaining member 6 are moved to allow a user to grasp the non-adhesive pull tab 4b and stretch the adhesive tape 4.

FIG. 9 shows an adhesive tape article 2 similar to that of FIGS. 1a and 1b being used to support an item 24 such as wire or cable, on a wall surface 22. The adhesive tape shown in FIG. 9 differs from the one shown in FIGS. 1a and 1b in that surface 10 in FIG. 9 is non-adhesive rather than adhesive.

The adhesive first end portion 4a of the adhesive strip 4 is adhesively bonded to the wall surface 22 and the non-adhesive pull tab portion 4b extends downwardly from the first end portion 4a and is be bent around the item 24 as indicated by arrow A. To remove the adhesive tape 4 from the wall surface 22, the non-adhesive pull tab 4b and the associated portion of the shape retaining member 6 are bent downward in the direction of the wall surface 22 to allow the adhesive tape 4 to be stretch removed by exerting a force on the pull tab in the plane of the adhesive connection.

The patents, patent documents, and patent applications cited herein are incorporated by reference in their entirety as if each were individually incorporated by reference. It will be apparent to those of ordinary skill in the art that various changes and modifications may be made without deviating from the inventive concept set forth above. Thus, the scope of the present invention should not be limited to the structures described in this application, but only by the structures described by the language of the claims and the equivalents of those structures.

What is claimed is:

1. A stretch releasable adhesive tape article, comprising:
   (a) an extensible adhesive strip having an adhesive first end portion and a non-adhesive second end portion defining a pull tab; and
   (b) a shape retaining member connected with said adhesive strip and arranged adjacent to said adhesive strip first and second end portions, said shape retaining member being repeatably manually movable between a first position allowing a user to manually grasp said non-adhesive pull tab to stretch release said adhesive strip from a substrate, and a displaced position for maintaining said non-adhesive pull tab at a position offset from said first position.

2. A stretch releasable adhesive tape article as defined in claim 1, wherein said shape retaining member is stiff and bendable.

3. A stretch releasable adhesive tape article as defined in claim 2, wherein said adhesive first end portion has opposed first and second major surfaces at least one of which is adhesive, said non-adhesive pull tab comprises a second end portion of said adhesive strip, and said shape retaining member is affixed to said first end portion adhesive surface and extends in overlapping relation with said non-adhesive pull tab.

4. A stretch releasable adhesive tape article as defined in claim 3, wherein said shape retaining member is adhesively bonded to said first end portion adhesive surface.

5. A stretch releasable adhesive tape article as defined in claim 1, wherein said shape retaining member is formed of metal.

6. A stretch releasable adhesive tape article as defined in claim 5, wherein said metal is selected from the group consisting of steel, brass, aluminum, copper, and lead.

7. A stretch releasable adhesive tape article as defined in claim 5, wherein said metal is annealed.

8. A stretch releasable adhesive tape article as defined in claim 5, wherein said shape retaining member is an elongate metal bar having a thickness of less than about 0.05 inches.

9. A siretch releasable adhesive tape article as defined in claim 5, wherein said shape retaining member is an elongate metal bar having a diameter of less than about 0.1 inches.

10. A stretch releasable adhesive tape article as defined in claim 1, wherein said shape retaining member has a serpentine shape.

11. A stretch releasable adhesive tape article as defined in claim 1, wherein said shape retaining member comprises a pair of generally parallel rails arranged adjacent to opposite side edges of said adhesive strip, whereby a user can grasp said non-adhesive pull tab between said rails and stretch release said adhesive strip from a substrate and from said rails.

12. A stretch releasable adhesive tape article as defined in claim 1, wherein said shape retaining member has a lattice-like structure and is attached to said adhesive first end portion.

13. A stretch releasable adhesive tape article as defined in claim 1, wherein said shape retaining member comprises a hinge movable between first and second fixed positions, said shape retaining member having a first end attached to said first end portion and a second end arranged adjacent to said non-adhesive pull tab portion.

14. A stretch releasable adhesive tape article as defined in claim 1, wherein said shape retaining member is arranged within said adhesive strip.

15. A stretch releasable adhesive tape article as defined in claim 14, wherein an intermediate portion of said shape retaining member is arranged within said adhesive strip non-adhesive pull tab and end portions of said shape retaining member are arranged adjacent to and extend along side edges of said adhesive strip.

16. A stretch releasable adhesive tape article as defined in claim 1, wherein said adhesive strip has a multi-layer construction.

17. The stretch releasable adhesive tape article of claim 1, wherein said article is configured such that said non-adhesive pull tab is maintained in a plane more offset from a plane of said first end portion in said displaced position than in said first position.

18. The stretch releasable adhesive tape article of claim 1, wherein said article is configured such that said shape retaining member selectively maintains said non-adhesive pull tab at a plurality of longitudinal extension positions relative to said first end portion.

19. The stretch releasable adhesive tape article of claim 1, wherein said first position and said displaced position relate to a position of said non-adhesive pull tab relative to said first end portion.

20. The stretch releasable adhesive tape article of claim 1, wherein said shape retaining member contacts said adhesive strip.

21. A stretch releasable adhesive tape article, comprising:
(a) an extensible adhesive strip having a non-adhesive pull tab; and
(b) shape retaining means connected with said adhesive strip and arranged adjacent to said adhesive strip non-adhesive pull tab, said shape retaining means being repeatably manually movable between a first position allowing a user to manually grasp said non-adhesive pull tab to stretch release said adhesive strip from a substrate, and a displaced position for maintaining said non-adhesive pull tab at a position offset from said first position.

* * * * *